United States Patent [19]

Inglin

[11] Patent Number: 5,560,428
[45] Date of Patent: Oct. 1, 1996

[54] HORSESHOE WITH REPLACEABLE ELEMENTS

[76] Inventor: Gerhard Inglin, Bodenfeldstrasse 23, 8902 Urdorf, Switzerland

[21] Appl. No.: 357,933

[22] Filed: Dec. 16, 1994

[30] Foreign Application Priority Data

Jan. 8, 1994 [EP] European Pat. Off. .............. 94100209

[51] Int. Cl.$^6$ ..................................................... A01L 1/04
[52] U.S. Cl. ............................................................. 168/11
[58] Field of Search ................................... 168/4, 11, 12, 168/31, 32, 35

[56] References Cited

U.S. PATENT DOCUMENTS

| | | | |
|---|---|---|---|
| 458,051 | 8/1891 | Hitch | 168/12 |
| 893,201 | 7/1908 | Scully | 168/11 |
| 1,035,530 | 8/1912 | Bushey et al. | 168/33 |
| 1,155,293 | 9/1915 | Wilson | 168/11 |
| 1,612,577 | 12/1926 | Hall | 168/4 |
| 3,747,684 | 7/1973 | Wallen | 168/4 |
| 4,585,068 | 4/1986 | Jungerson . | |
| 4,757,864 | 7/1988 | Juncker . | |
| 5,105,891 | 4/1992 | Noffsinger | 168/4 |

FOREIGN PATENT DOCUMENTS

| | | |
|---|---|---|
| 0280656 | 2/1987 | European Pat. Off. . |
| 2459614 | 6/1980 | France . |
| 2512640 | 9/1981 | France . |
| 230939 | 12/1923 | United Kingdom . |
| WO83/03949 | 11/1983 | WIPO . |
| WO86/05655 | 10/1986 | WIPO . |

Primary Examiner—Robert P. Swiatek
Assistant Examiner—Elizabeth Shaw
Attorney, Agent, or Firm—Oliff & Berridge

[57] ABSTRACT

A horseshoe includes a basic part and a replaceable sole. The basic part is provided with a basic body and fastening elements. The basic body is horseshoe-shaped and has an abutment surface that is affixable to a hoof of a horse. The basic body also includes two legs, each leg having nail holes spaced along its length. The nail holes are positioned between and offset from a series of first cut out portions. The sole is insertible into the basic part and has protrusions that engage the first cut out portions and fastening openings for receiving the fastening elements. The solid basic body permits the horseshoe to be hot-shoed and provides a foundation for mounting other components, including, e.g., calks and a snowguard insert.

29 Claims, 11 Drawing Sheets

HORSESHOE WITH REPLACEABLE ELEMENTS

BACKGROUND OF THE INVENTION

The present invention relates to horseshoes and, in particular, to a horseshoe having various replaceable elements, e.g., a sole, calks and a snowguard, to suit varied riding conditions.

A horseshoe having a replaceable sole fabricated from an elastic material is disclosed in U.S. Pat. No. 4,585,068 to Jungerson. This horseshoe includes a basic part that is formed by drawing metal. The basic part forms a channel delimited by a base wall, an inner side wall and an outer side wall. Nail holes are provided in the base wall for fastening the basic part to the hoof with horseshoe nails. The side walls include a plurality of hooks that project into the channel and are spaced along the lower border of the side walls. The hooks are formed as one piece with the basic part. The horseshoe also includes a replaceable sole that consists of an elastic material. The sole is provided with a rear beading that is intended to be inserted into the channel. The rear beading has fastening cutouts into which the hooks of the basic part engage when the sole is inserted into the base part.

Hot-shoeing the conventional type of horseshoe that has an exchangeable sole, however, is possible over only a very limited range. Hot-shoeing is a process by which a basic part of a horseshoe that approximately matches the size of a particular hoof is heated such that it can be shaped to follow the contour of the hoof. Because this conventional horseshoe has a U-shaped cross section, the side walls are thin and tend to collapse inward or bow outward during the hot-shoeing process. Accordingly, the basic part of the conventional horseshoe must be provided in a great number of sizes and shapes to fit the range of horse hooves. In addition, the thinness of the basic part of the conventional horseshoe is not suitable for mounting special fittings to adapt the horseshoe to special conditions and requirements. Consequently, providing a horseshoe having replaceable elements that overcomes these drawbacks would be desirable.

SUMMARY OF THE INVENTION

An object of the present invention is to provide a horseshoe to which replaceable elements and special fittings can be attached that can also be hot-shoed without difficulty.

This and other objects are achieved by providing a horseshoe having a basic part that includes a solid, horseshoe-shaped basic body and fastening elements. The basic body has an abutment surface, first cut out portions and two legs having nail holes. The abutment surface is affixed to a hoof of a horse when the horseshoe is mounted. The nail holes are spaced along the length of each leg. In a preferred embodiment, the nail holes are arranged between and offset toward the outside of the first cut out portions. The fastening elements project outward from the basic body in a direction opposite the abutment surface.

The sole is connected to the basic part by protrusions that engage the first cut out portions and second cut out portions in the sole that receive the fastening elements. The sole is preferably fabricated from an elastic, impact-damping and abrasion-resistant material, e.g., polyurethane.

The fastening elements can be fastening bolts that project from the first cut out portions of the basic body. The fastening elements can also be threaded weld-on bolts that are attached to the basic body by, e.g., pressure arc welding. The second cut out portions are preferably disposed within and coaxial with the protrusions of the sole. Preferably, the first cut out portions and the protrusions are either conical or cylindrical.

The ends of the two legs can terminate in a grooved end portion. Each grooved end portion is dimensioned to receive a wedge. In a preferred embodiment, the grooved end portion is closed at a rear side. The wedge can be attached to a sole, e.g., by attaching it to a reinforcement member embedded within the elastic sole material. Alternatively, the wedge can be formed as one piece with a threaded sleeve. The other end of the threaded sleeve projects into a through-passage of the sole to receive a calk.

The front portion of the basic body can include a depression dimensioned to receive an engagement element attached to the sole. The sole can also include a plate-like insert that has a retaining part. The insert is preferably fabricated from a rigid material, e.g., metal. The retaining part projects into the engagement element of the sole and further engages the depression of the body. The retaining part and the engagement element can be provided with under cut portions that engage each other and form a hook-like connection. A continuation part that further engages the engagement element can also be provided.

The basic body can include a border beading and the sole can include a mating edge clearance such that the border beading and the edge clearance mate together when the sole is attached to the basic part.

In another embodiment, the horseshoe can include a hose-like, flexible snowguard insert. The snowguard insert is positioned at the inner border of the basic body between the basic body and the sole to prevent snow and ice from accumulating in the region beneath the hoof or on the sole. The snowguard insert includes eyelets that engage fasteners or protrusions. The fasteners or protrusions can be attached to the sole or the basic part.

Because the sole is manufactured from an elastic material, a good frictional locking connection can be achieved between the protrusions and the fastening elements. Since the basic body has an essentially solid cross section, the nail holes in the basic body guide the horseshoe nails and ensure that they grip well when they are driven into the hoof. The solid basic body nevertheless permits the use of a thick replaceable sole that has a considerable service life. Because the sole material is elastic and has impact-damping and vibration-damping properties, the forces exerted on the horse's joints, tendons and ligaments are reduced. Damage to roadways and the level of noise created by conventional horseshoes are also reduced. The basic body can be used a number of times and can be fastened on the hoof by conventional horseshoe nails.

BRIEF DESCRIPTION OF THE DRAWINGS

The present invention will now be explained in more detail with reference to the drawing, in which.

DETAILED DESCRIPTION OF PREFERRED EMBODIMENTS

Figure 1:
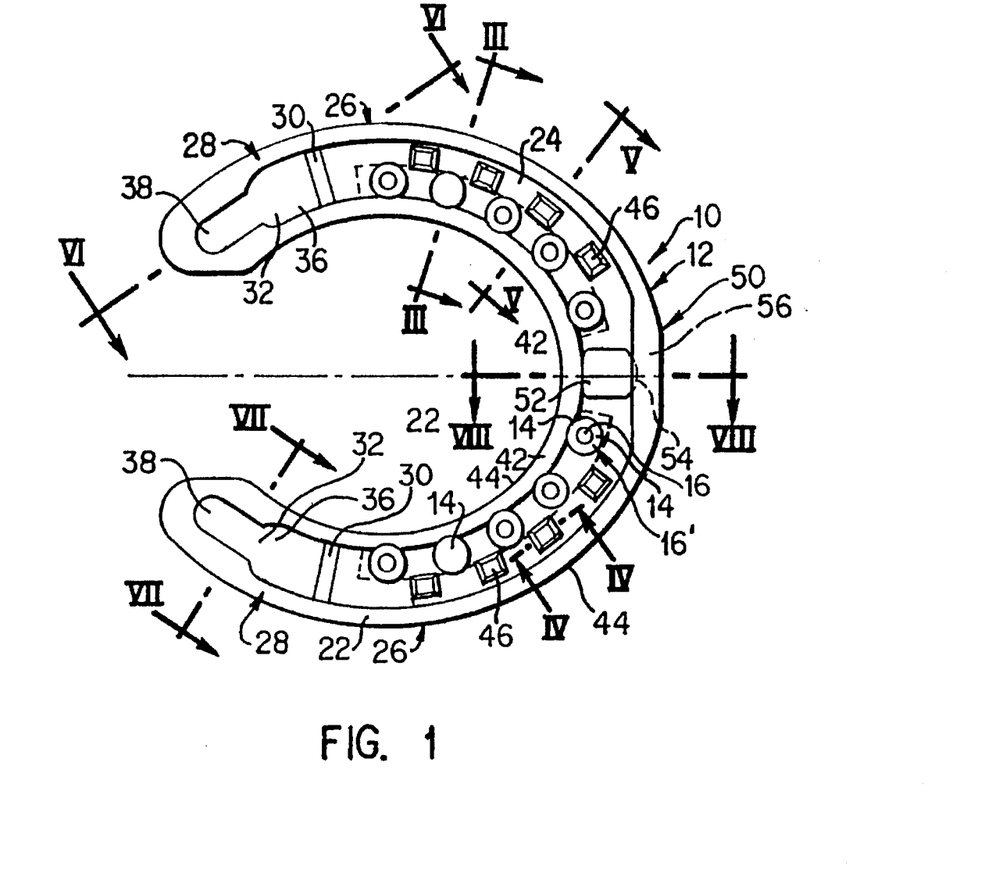
FIG. 1 shows a bottom view of the basic part of the horseshoe according to the invention.
Figure 2:
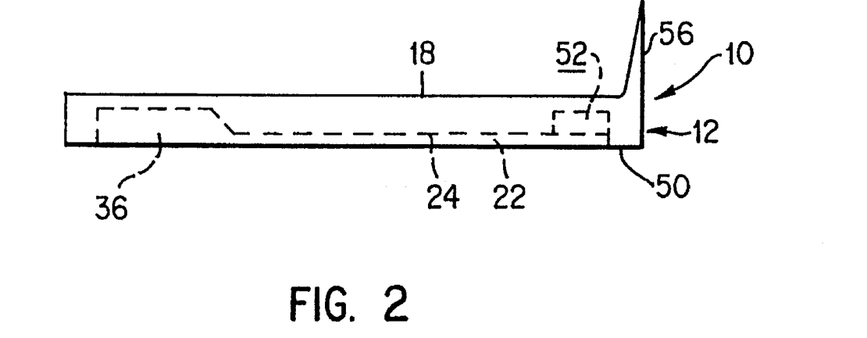
FIG. 2 shows a side view of the basic part shown in FIG. 1.
Figure 3:
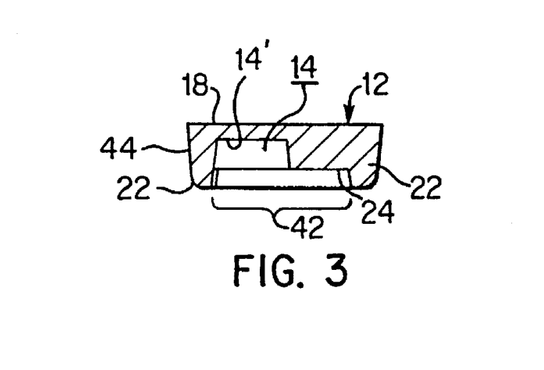
FIGS. 3 to 8 show sectional views along lines III—III to VIII—VIII in FIG. 1 through the basic part shown in FIGS. 1 and 2.

The horseshoe according to the present invention includes a basic part 10, as shown in FIGS. 1 and 2. The basic part 10 includes a horseshoe-shaped solid basic body 12 and fastening bolts 16 that are arranged in cutouts 14 of the basic body 12 to form fastening elements 16'. The basic body 12 is fabricated from a metal, preferably iron.

Figure 11:
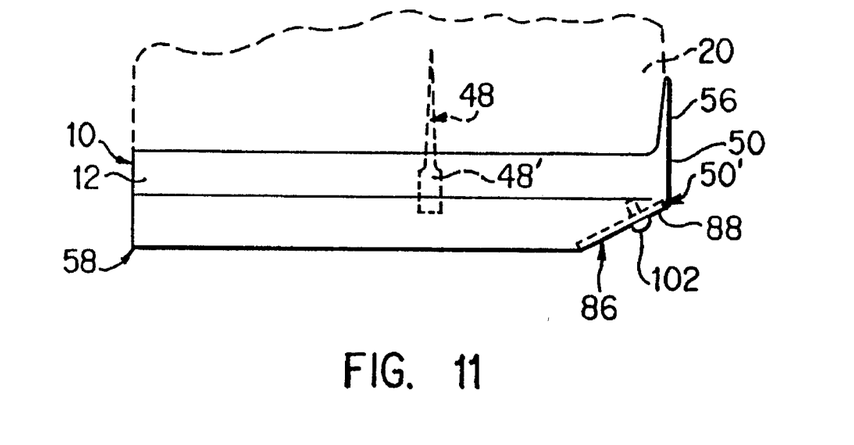

As shown in FIGS. 1 to 8, the basic body 12 includes on its upper side an essentially planar abutment surface 18 that is laid against the hoof 20 of a horse (see FIG. 11). The cross section of the basic body 12 is essentially rectangular or trapezoidal and includes an encircling border beading 22 that projects beyond an essentially planar basic surface 24 running parallel to the abutment surface 18. The thickness of the basic body, measured in a direction at a right angle to the abutment surface 18, is approximately 6 mm from the abutment surface 18 to the basic surface 24 in a preferred embodiment. The border beading 22 projects beyond the basic surface 24 by 1 mm to 3 mm, preferably about 2.5 mm. The basic surface 24 extends from the center front portion of the basic body 12 along each of two legs 26 to an end portion 28. Each end portion 28 of the basic surface 24 is adjoined by a sloping transition surface 30. The transition surface 30 joins an end surface 32 that is essentially parallel to the abutment surface 18

Figure 6:
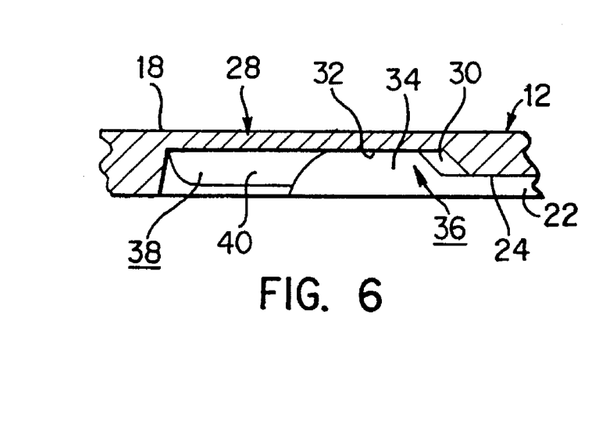
Figure 7:
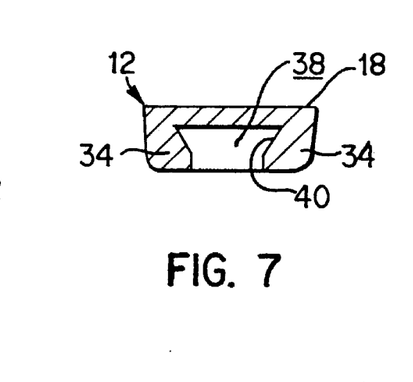
Figure 8:
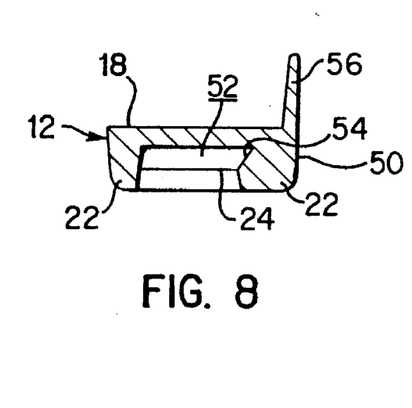

As shown in FIGS. 6 and 7, the end surfaces 32 are offset with respect to the base surface 24 in the direction of the abutment surface 18. As a result, the remaining wall thickness of the basic body 12 between the end surfaces 32 and the abutment surface 18 is preferably about 2.5 mm. The end surface 32, together with the side walls 34 adjoining it, delimit an end cutout 36. The width of the end cutout 36, measured at a right angle to the longitudinal extent of the legs 26, tapers in a shoulder-like manner approximately midway between the transition surface 30 and the end of the end cutout 36 that is directed away from the transition surface 30. As a result, the cross section of the end cutout 36 is smaller than the cross section of a continuation portion 38. As can be seen in FIGS. 6 and 7, the side walls 34 in the region of the continuation portion 38 are undercut, e.g., by milling, to form a groove 40 having a dovetail-shaped cross section 40. The groove 40 is closed at the free end of the continuation portion 38 and is open to the front toward the wider region of the end cutout 36.

Each of the two legs 26 includes a series of first cut out portions 14 that are disposed along the longitudinal direction of the legs. In one embodiment, five such first cut out portions 14 extend from the basic surface 24 to the abutment surface 18. The first cut out portions 14 are located in a region 42 that extends along the inner border 44 of the basic body 12 as shown in the figures. The essentially cylindrical or conically tapering first cut out portions 14 are spaced apart from the border 44 at a distance approximately the thickness of the border beading 22. The region 42 extends approximately over half the width of the basic body 12 (FIG. 3) and over approximately two-thirds of the length of the legs 26 (FIG. 1). The base of the first cut out portions 14, which runs approximately parallel to the abutment surface 18, is spaced apart from the abutment surface by approximately 2 mm.

Figure 17:
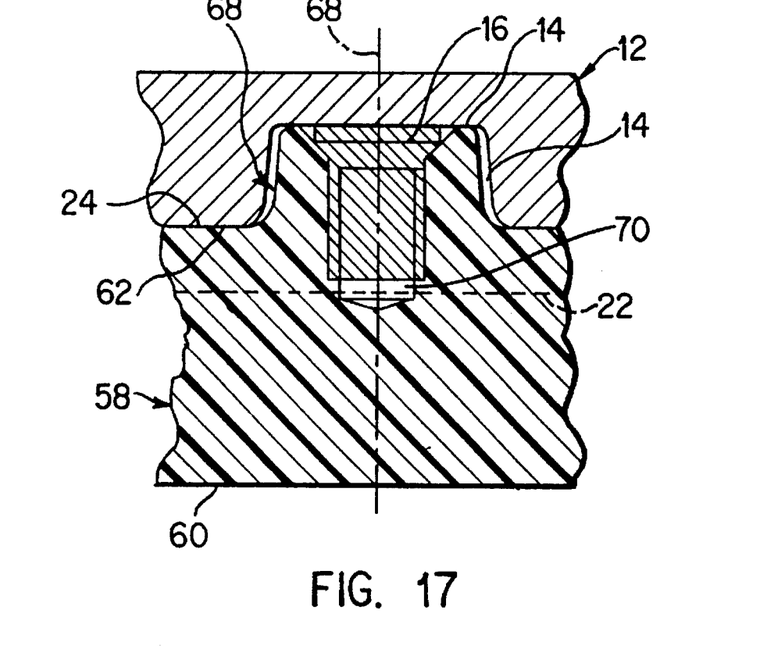

In the case of the example shown in FIG. 1, one mounting bolt 16 is arranged, respectively, in the rearmost first cut out portion 14 and in each Of the three first cut out portions 14 nearest to the front of the horseshoe. As shown in FIG. 17, these mounting bolts are preferably conventional steel threaded weld-on bolts. The mounting bolts 16 are copperplated and are fastened to the basic body 12 by pressure arc welding. The mounting bolts project beyond the plane of the basic surface 24, but terminate before the end of the border beading 22, as viewed from a direction at a right angle to the abutment surface 18. As a result, the mounting bolts 16 are protected from damage. Depending upon the expected load, mounting bolts 16 can be used in some or all of the first cut out portions 14.

Figure 4:
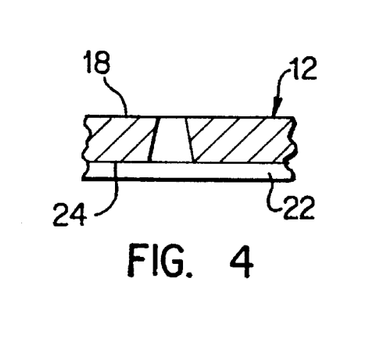
Figure 5:
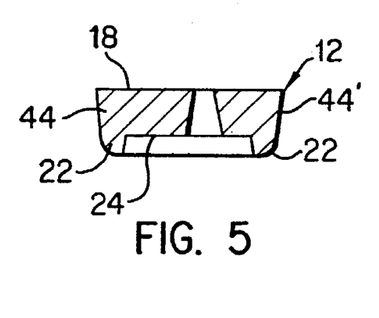

As shown in FIGS. 1, 4 and 5, each leg 26 exhibits a series, four in the present case, of nail holes 46 (i.e., four as shown) that are spaced from each other in the longitudinal direction of the legs 26. The nail holes 46 are arranged, as seen in the longitudinal direction of the legs 26, between adjacent first cut out portions 14. The nail holes 46 are also offset from the first cut out portions 14 in the direction of the outer border 44'. Preferably, the nail holes 46, as viewed from a direction at a right angle to the longitudinal direction of the legs 26, adjoin the region 42 directly. The nail holes 46 are preferably formed as frustoconical through-passages through the basic body 12. Accordingly, conventional E or IC horseshoe nails 48 can be used to fasten the basic body 12 to the hoof 20 (see also FIG. 11). Further, the basic body 12 includes a depression 52 in the front region 50 at which point the two legs 26 abut (see also FIGS. 8 and 18). The front flank of the depression 52 is provided with an undercut 54. A front cap 56 or side caps may also be formed as one piece with the basic body 12, as is known in the art.

Figure 12:
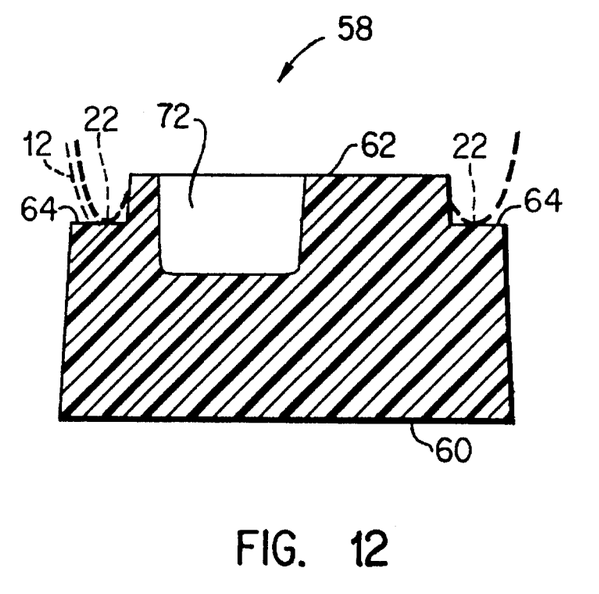
FIG. 12 shows a sectional view along line XII—XII of the sole shown in FIG. 9.
Figure 13:
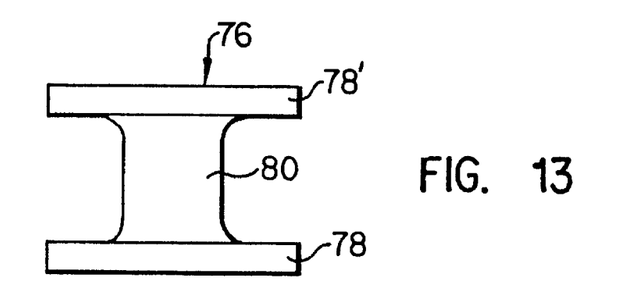
FIGS. 13 and 14 show elevation and plan views, respectively, of a reinforcement member for the sole.
Figure 14:
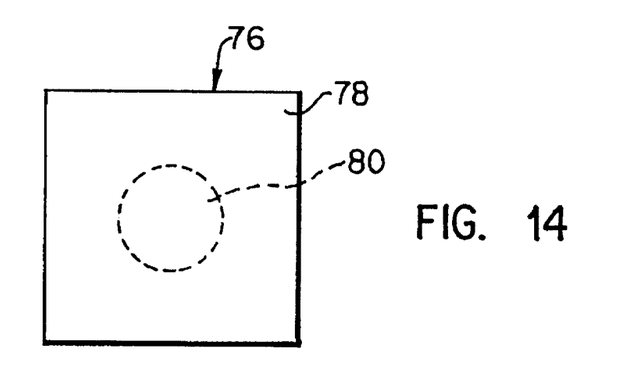
Figure 15:
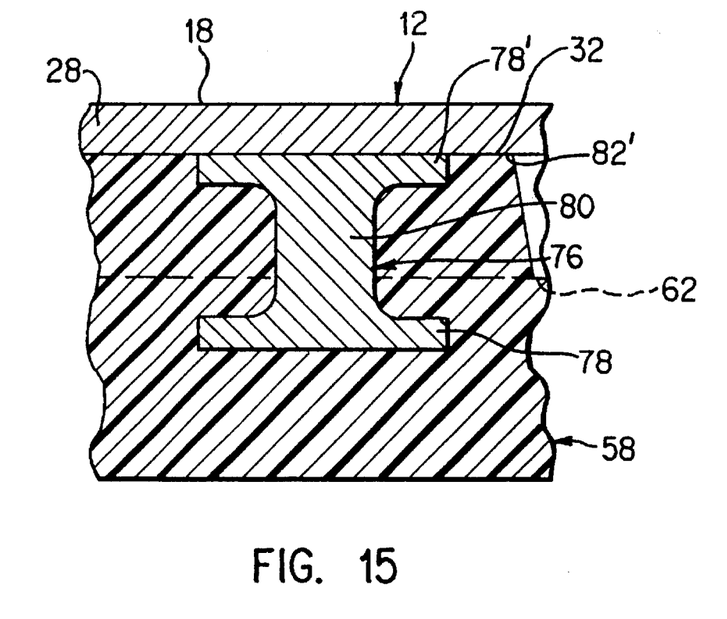
FIGS. 15 to 18 show sectional views along lines XV—XV to XVIII—XVIII in FIG. 10 through the horseshoe shown in FIGS. 10 and 11, the sole being shown on the bottom and the basic part being shown on the top.
Figure 16:
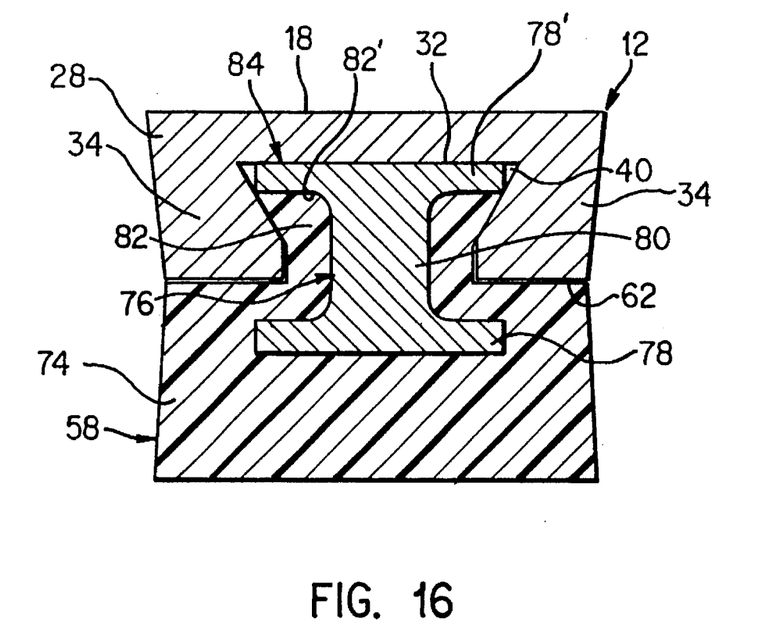

A horseshoe-shaped sole 58 is fabricated from an elastic, vibration-damping, impact-damping and, preferably, abrasion-resistant material, e.g., a polyurethane. As shown in FIGS. 12 and 16, the sole 58 has an essentially rectangular or trapezoidal cross section. A standing surface 60 is disposed opposite a load-bearing surface 62. The load-bearing surface 62 is directed toward the basic body 12 and lies adjacent the basic surface 24 when the sole 58 is mounted on the basic part 10. The border of the load-bearing surface 62 of the sole 58 includes an edge clearance 64 into which the border beading 22 is inserted when the sole 58 is mounted.

Figure 9:
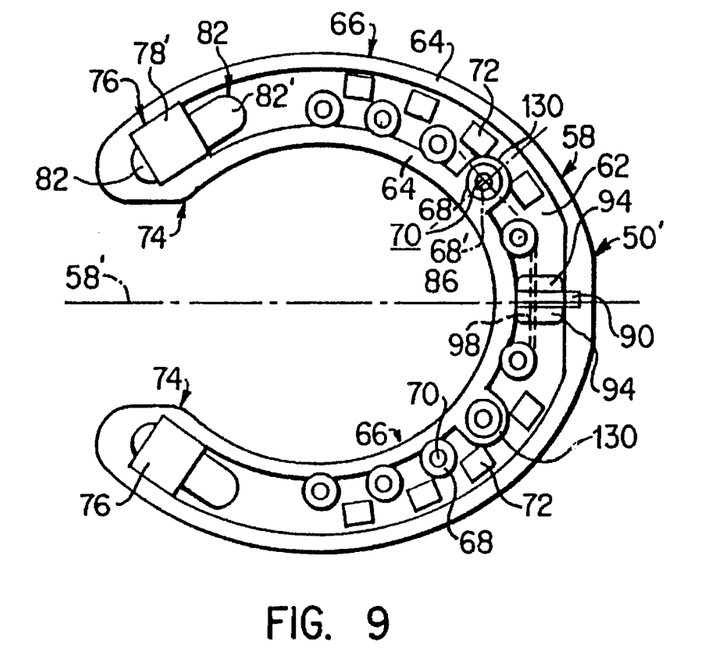
FIG. 9 shows a plan view of a first embodiment of a sole of the horseshoe.

A series of peg-like protrusions 68 engage corresponding first cut out portions 14 in the basic body 12. The protrusions 68 project beyond the load-bearing surface 62 in each leg 66 of the sole 58 when it is mounted. The protrusions 68 are essentially cylindrical. Alternatively, each protrusion can be conically tapered in the direction of its free end, as shown in FIG. 17. Each protrusion 68 includes a second cut out portion 70 that is coaxial with the axis 68' of the protrusion 68 and is smaller in diameter than the fastening bolts 16. If the fastening bolts 16 are threaded, the diameter of the second cut out portion 70 preferably corresponds to the core diameter of the fastening bolts. As a result, good frictional locking between the bolts and the sole 58 can be achieved. As shown in FIG. 9, a series of nail-head clearances 72, arranged in correspondence to the nail holes 46 in the basic body 12, are provided on each leg 66 of the sole 58 to receive and to enclose those parts of the heads 48' of the horseshoe nails 48 that project beyond the basic surface 24.

In the free end regions 74 of the legs 66, a reinforcement member 76 is embedded in the sole 58 as shown in detail in FIGS. 13 to 16. Each reinforcement member 76 includes two parallel, preferably square, plates 78 that are connected to one another via a central shaft part 80. The lower plate 78 is embedded in the body of the sole 58, whereas the upper plate 78' is disposed above the load-bearing surface 62. The portion of the shaft part 80 that projects beyond the body of the sole 58 is embedded in a wedge-like protrusion 82 of the sole 58. The width of the wedge-like protrusion 82, viewed transversely with respect to the longitudinal direction of the respective leg 66 (FIG. 16), is narrower than the plate 78. An upper surface 82' of the wedge-like protrusion is aligned with the upper surface of the plate 78' and extends in the longitudinal direction of the respective leg 66 toward its free end slightly beyond the upper plate 78 and, in the direction toward the front, to a greater extent beyond the upper plate 78'. The entire length of the wedge-like protrusion 82 corresponds approximately to the length of the end surface 32 in the basic body 12. The plate 78', in conjunction with the groove 40, forms a groove/wedge connection 84 between the sole 58 and the basic part 10. The upper surface 82' is arranged above the load-bearing surface 62 by approximately the same amount as the end surface 32 of the basic body 12 with respect to the basic surface 24.

Figure 10:
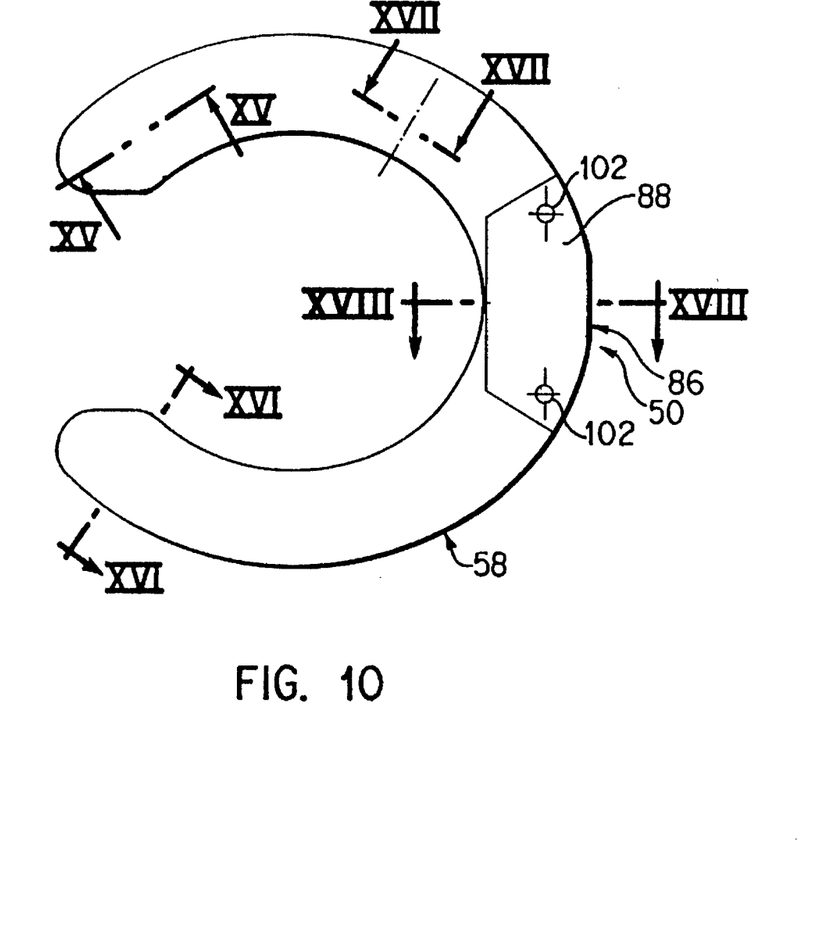
FIGS. 10 and 11 show bottom and side views, respectively, of a horseshoe having a basic part according to FIGS. 1 to 8 having a sole fastened thereon according to FIG. 9.
Figure 18:
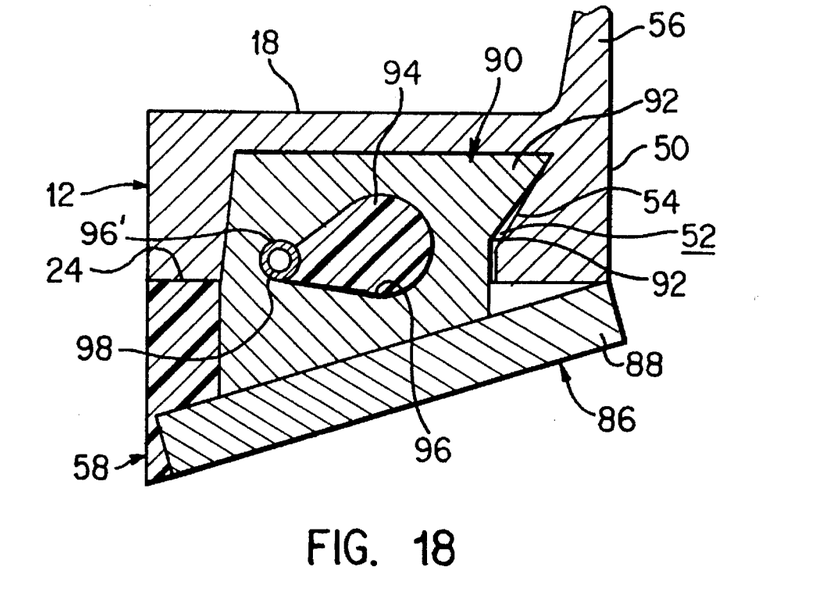

As also shown in FIGS. 10, 11 and 18, a plate-like insert 86 fabricated from a hard material, e.g., manganese steel, is embedded in the front region 50' of the sole 58. This insert 86, shown on an enlarged scale in FIGS. 19 and 20, includes a tread plate 88 having a retaining part 90 that projects therefrom. The retaining part 90 includes an undercut 92 on its front flank. A retaining nose 92' engages the undercut 54 in the depression 52 of the basic body 12 in order to form a hook-like connection when the sole 58 is mounted on the basic body 12. The retaining part 90 projects beyond the load-bearing surface 62 (FIG. 9) and is embedded in an engagement element 94. The engagement element 94 is dimensioned to engage the depression 52 and is formed as one piece with the sole 58. The plate-like retaining part 90 that is connected to the insert by, e.g., a weld, includes a through-passage 96 having a droplet-shaped cross section. A cylindrical widening 96', into which a spring cotter 98 is inserted, is continuously formed with the through-passage 96 at its tapered end. The tread plate 88 is securely fastened onto the sole 58 by the material of the sole 58 and the spring cotter 98 projecting through the through-passage 96.

Figure 19:
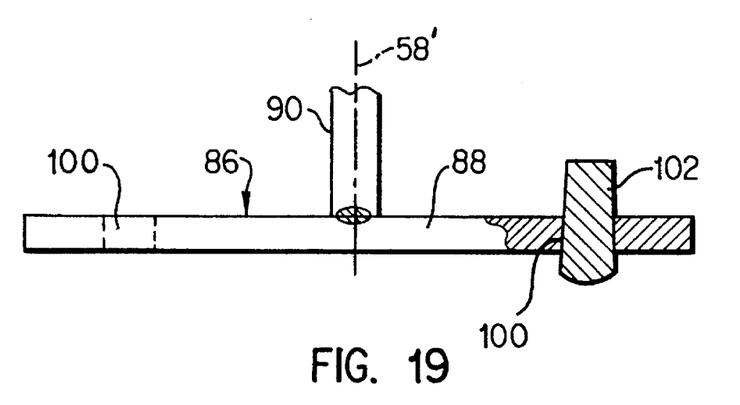
FIGS. 19 and 20 show side and bottom views respectively, of an insert for the sole in the front region.
Figure 20:
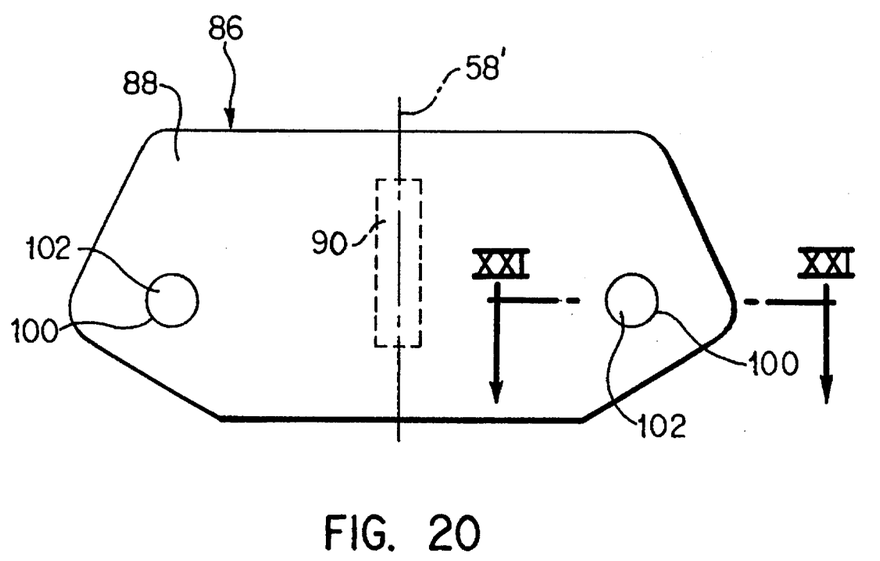
Figure 21:
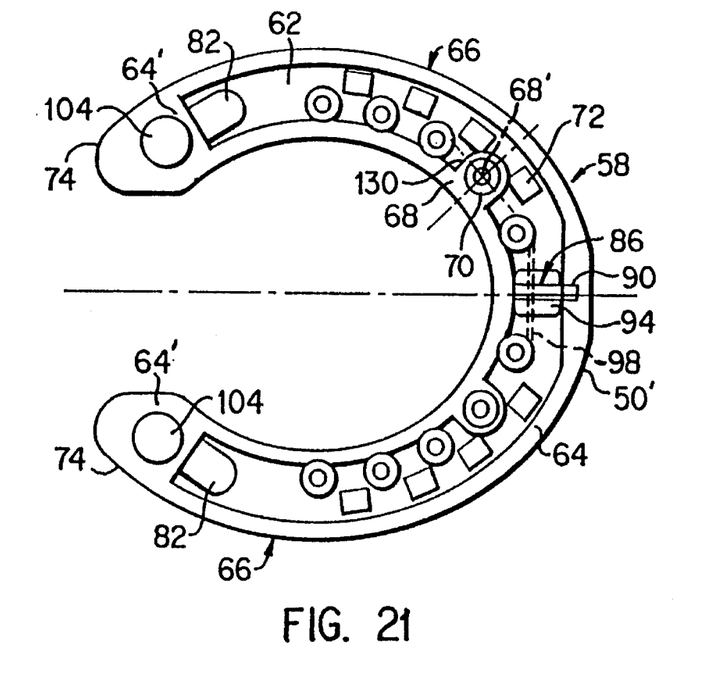
FIG. 21 shows a plan view of a second embodiment of the sole of the horseshoe.
Figure 22:
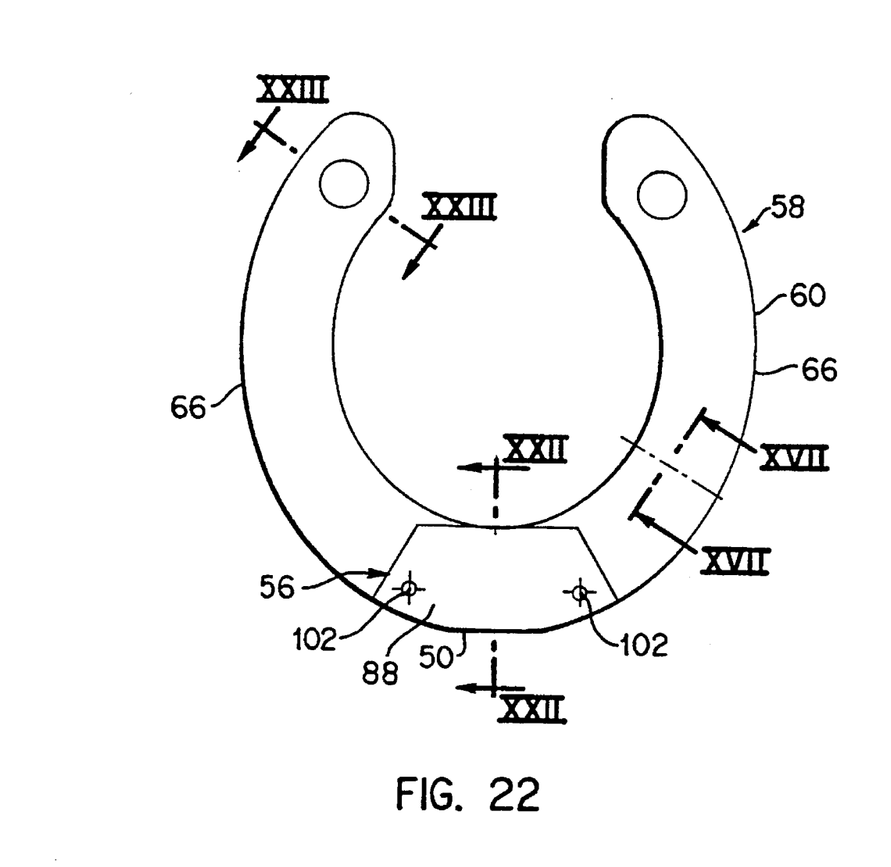
FIG. 22 shows a bottom view of the sole shown in FIG. 21, mounted on a basic body according to FIGS. 1 to 8.

In addition, the tread plate 88 includes two holes 100 that are arranged symmetrically with respect to the longitudinal center plane 58' of the sole 58. The holes 100 are disposed to receive pins 102 of a conventional type. The heads of the pins 102 project downward beyond the tread plate 88 and, at their other ends, terminate approximately at the load-bearing surface 62. Consequently, when the sole 58 is mounted, the pins 102 are supported on the basic body 12. The pins can be readily removed by driving them out of the tread plate 88. The tread plate 88 is arranged such that it rises toward the front, thus ensuring an anatomically correct rolling motion when the horse's hoof meets the ground.

The sole 58 is attached to the basic body 12 as follows. First, the wedge-like protrusion 82 and the plate 78' are inserted into the end cutout 36, and the sole 58 is displaced toward the rear with respect to the basic part 10 until the plate 78 (acting as wedge) has moved at least partially into the groove 40. Then, while bending the sole 58, the engagement element 94 is engaged with the depression 52, and the retaining part 90 engages the undercut 54 in a hook-like manner. By pressing the legs 66 of the sole 58 onto the basic body 12, the plates 78' can be fully inserted into the grooves 40, and the protrusions 68 of the sole 58 can be inserted into the cutouts of the basic body 12. As a result, the fastening bolts 16 become engaged with the fastening cutouts 70 in order to achieve a good frictional locking grip.

The groove/wedge connection 84 and the hook-like engagement of the insert 86 with the undercut 54 provide an additional frictional locking grip in a direction at a right angle to the abutment surface 18. The inadvertent release of this hook-like engagement is prevented because the length of the retaining part 90, as viewed from the direction of the longitudinal center 58', is appropriately matched to the depression 52. Furthermore, when the sole 58 is mounted, the part of the wedge-like protrusion 82 that projects rearward beyond the plate 78' lies against the end of the continuation portion 38.

In order to detach the sole 58, a tool, e.g., a screwdriver or pliers, is inserted in the central region of the legs 26 between the sole 58 and the basic part 10. By bending the sole 58, it can be removed from the basic part 10. As a result, the frictional locking connection between the protrusions 68 and the fastening bolt 16 is released. Because of resulting deformation of the sole 58, the retaining continuation 90 can be pivoted out of the depression 52 and the engagement element 94 can be removed from the depression 52. Subsequently, by displacing the sole 58 forward, the groove/wedge connection 84 to the two legs 26 can also be released.

In a second embodiment of the present invention, as shown in FIGS. 21 to 28, the basic part 10 is of the same design as described above and shown in FIGS. 1 to 8. With the exception of the design of the end portions 28 of the two legs 66, the sole 58 is also of the same design as described above and shown in FIGS. 9, 12 and 17 to 20. At the location where the reinforcement member 76 is disposed in the first embodiment according to FIG. 9, the sole 58 in the second embodiment includes a through-passage hole 104. A wedge-like end protrusion 82 projects beyond the load-bearing surface 62 in the end region 74. This end protrusion 82 terminates together with the load-bearing surface 62, but at a distance in front of the through-passage hole 104. The edge clearance 64 forms end clearances 64' at the end of the legs 66.

Figure 23:
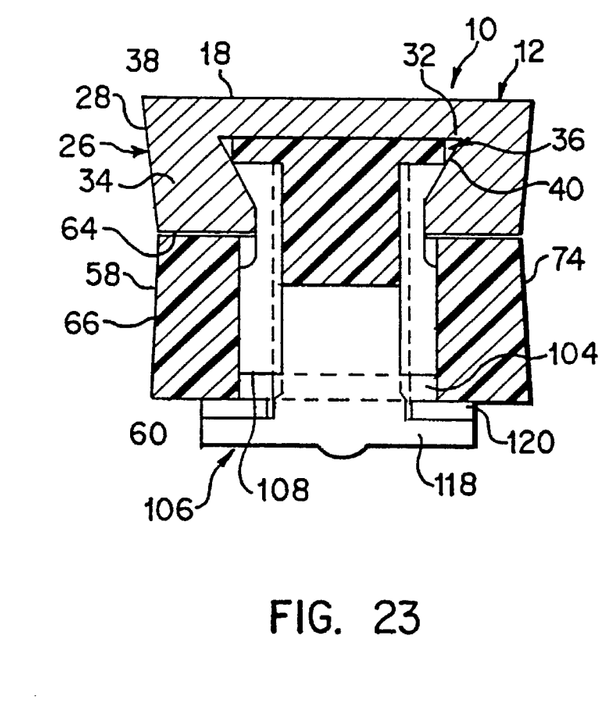
FIG. 23 shows the horseshoe according to FIG. 22 with a calk insert, in a section along line XXIII—XXIII, the sole being shown on the bottom and the basic part being shown on the top.
Figure 24:
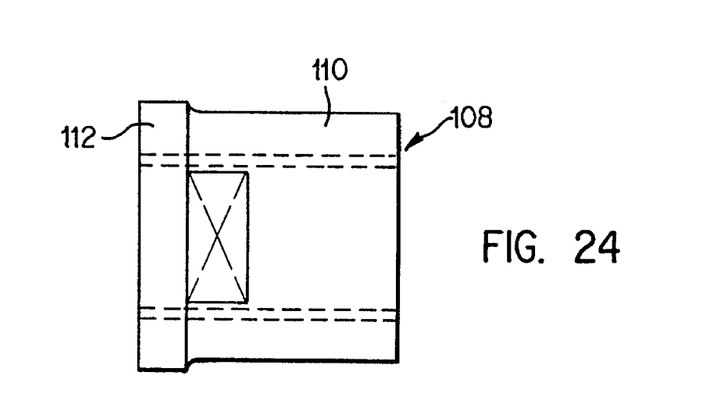
FIGS. 24 to 26 show elevation, side and plan views, respectively, of the calk insert shown in FIG. 23.
Figure 25:
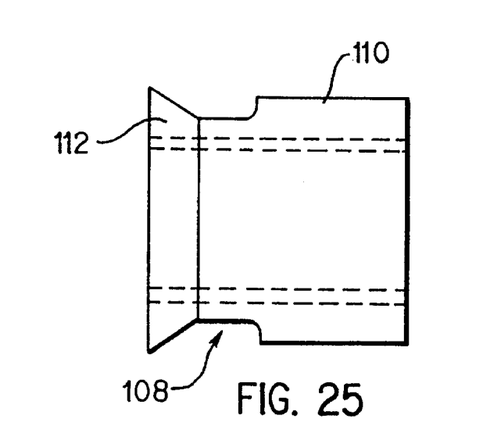
Figure 26:
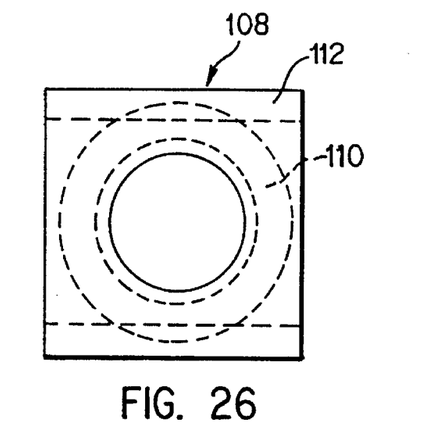
Figure 27:
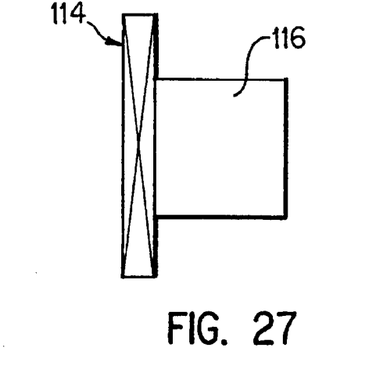
FIG. 27 shows an elevation view of an elastic intermediate layer of the calk insert.
Figure 28:
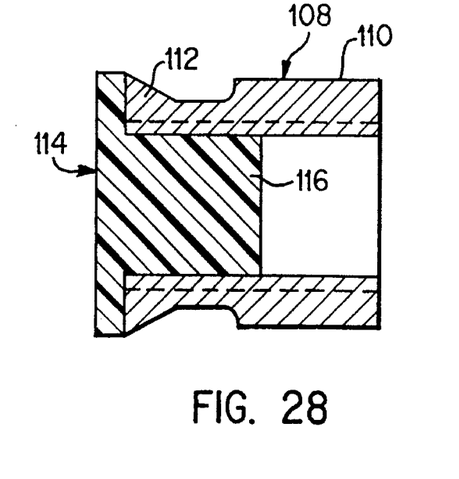
FIG. 28 shows a longitudinal sectional view through the threaded sleeve shown in FIGS. 24 to 26 with an intermediate layer inserted therein.

As shown in FIG. 23, a calk insert 106 can be inserted into the through-passage hole 104. The insert 106 includes a threaded sleeve 108, as shown in detail in FIGS. 24 to 26. The threaded sleeve is a one piece unit having an essentially cylindrical shaft portion 110 on which a wedge plate 112 is formed at one end. A plate-like intermediate layer 114 can be positioned on the wedge plate 112. The intermediate layer 114 includes a cylindrical fastening stub 116 that engages the through-passage of the threaded sleeve 108 for fastening the threaded sleeve 108 when the intermediate layer 114 is mounted.

As shown in FIG. 23, a calk 118 can be screwed into the threaded sleeve 108 from the side directed away from the wedge plate 112. The calk is supported on the standing surface 60 of the sole 58 by a washer 120. By tightening the calk 118 to a specific torque with the threaded sleeve 108, a prestress in the sole 58 can be created. The calk insert 106 is mounted according to the following procedure. First, the intermediate layer 114 is attached to the threaded sleeve 108. The intermediate layer 114 is then inserted from the side directed toward the basic part 10 into the through-passage 104 of the sole 58. Subsequently, the calk 118, together with the washer 120, is partially threaded into the threaded sleeve 108 but not tightened.

The sole 58 can be mounted on the basic part 10 together with the calk insert 106 as described above for the first embodiment. The wedge plate 112 is inserted into the groove 40, and the engagement element 94 is inserted into the depression 52 in the front region 50 of the basic part 10. By pressing the legs 66 against the basic part 10, the fastening bolts 16 engage the fastening cutouts 70 in the protrusions 68. Each calk 118 is then tightened on the threaded sleeve 108, and the wedge plate 112 is guided into the groove 40 to prevent the threaded sleeve 108 from rotating. As a result, a prestress is created in the sole 58 and in the intermediate layer 114. The intermediate layer 114 is pressed against the basic body 12 by the force of the calk 118 against the fastening stub 116. A calk can be easily changed while the sole 58 is mounted on the basic part 10 by unscrewing the calk and threading a replacement calk into the threaded sleeve 108.

Alternatively, the sole 58 can be mounted by inserting the threaded sleeve 108 with the attached intermediate layer 114 into the groove 40. The engagement element 94 is then engaged with the depression 52 and the sole 58. By pivoting the sole 58 about an axis running at a right angle to its longitudinal center 58', the sole 58 comes into contact with the basic part 10, the fastening bolts 16 engage the fastening cutouts 70, and the end regions 74 are pushed over the shaft portion 110 of the threaded sleeve 108. Finally, the calk 118, together with the washer 120, is screwed into the threaded sleeve 108 and tightened. The intermediate layer 114 between the threaded sleeve 108 and the basic body 12 as well as the prestressed sole 58, damp the impacts and vibrations transmitted through the calks 118 when the horse steps on the ground.

The basic part 10 and the sole 58 are connected to one another in the front region 50, 50' and in the rear end regions 74 and end portions 28 by fasteners that engage depressions. The fasteners are positively locked in the direction transverse to the basic part 10 and can be disengaged by bending the elastic sole 58. Frictional locking fasteners 16, 70 are received by depressions 36, 52 and cutouts 14 to prevent the frictional locking fasteners from disengaging when the sole 58 is mounted. Together, the frictional locking fasteners, depressions and cutouts keep the sole 58 in engagement with the basic part 10.

Figure 29:
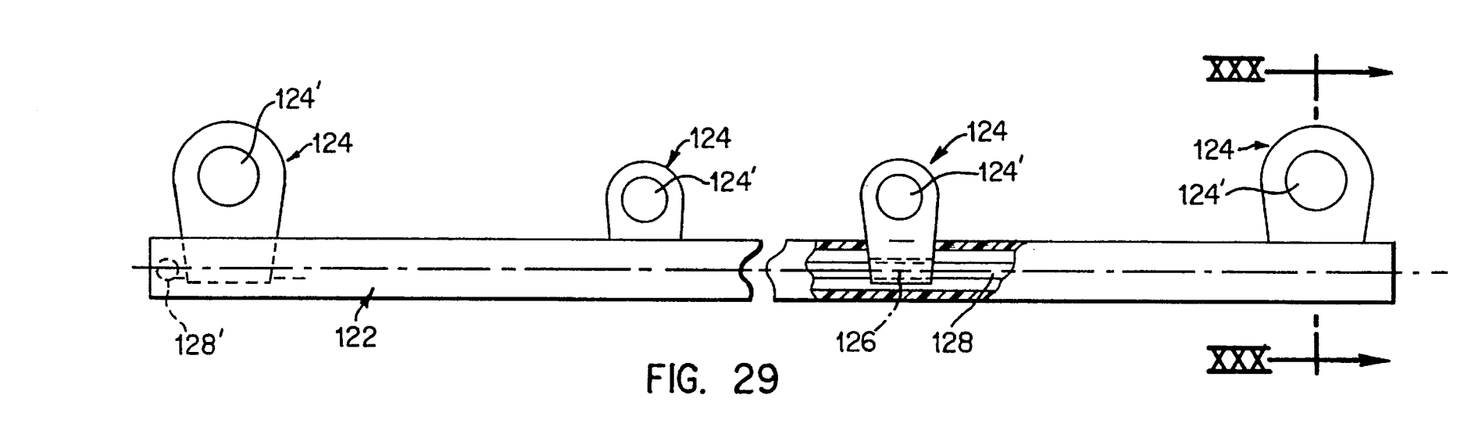
FIG. 29 shows a top and partial sectional view of a snowguard insert.
Figure 30:
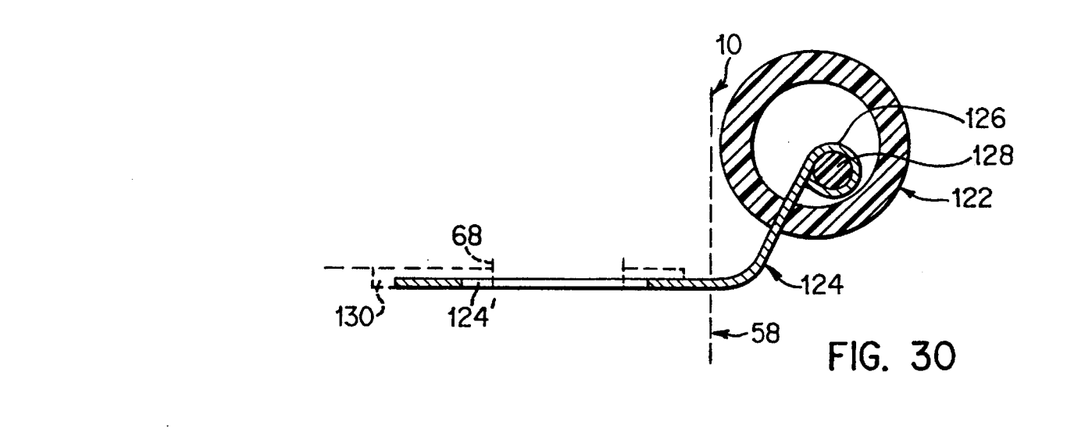
FIG. 30 shows a sectional view along line XXX—XXX of the snowguard insert according to FIG. 29.

Because the calks 118 are used to prevent the horse from slipping, especially during horse jumping and inclement weather, a danger exists that lumps of snow will form and solidify on the horseshoe, particularly in the space enclosed by the horseshoe beneath the hoof or on the sole of the horseshoe. In order to avoid this danger, a hose-like flexible snowguard insert 122, as shown in FIGS. 29 and 30, can be mounted on the horseshoe. The snowguard insert 122 includes fastening eyelets 124 fabricated from, e.g., stainless spring sheet steel, disposed to penetrate the wall of the snowguard insert 122. Each fastening eyelet is bent at its end to form a bushing 126, within which a core 128 is disposed. The core 128 is fabricated from plastic and is widened at both ends 128' to prevent it from sliding out of the bushing 126. A tongue-like portion of each fastening eyelet 124 projects out of the snowguard insert 122 and includes an eyelet hole 124.

To mount the snowguard insert 122 on the horseshoe, the sole 58 is separated from the basic part 10. The snowguard insert 122 is positioned along the inner border of the sole 58 such that when the sole 58 is mounted, the snowguard insert 122 follows the inner border 44 of the basic part 10. The two center fastening eyelets 124 are pushed onto the protrusion 68 that is second from the front along each leg 26. As a result, the corresponding protrusion engages the eyelet hole 124' of the corresponding fastening eyelet 124, as is shown by the broken lines in FIG. 30. The edge clearance 64 is continued (see FIGS. 9 and 21) in the form of a fastening groove 130 that engages around the respective protrusion 68. Accordingly, the load-bearing surface 62 of sole 58 lies directly against the basic surface 24, even when the snowguard insert 122 is mounted. Subsequently, the shaft portion 110 of the two threaded sleeves 108 is inserted into the eyelet holes 124' of the two outer fastening eyelets 124, and the calk insert 106 is mounted on the sole 58. The sole 58, together with the snowguard insert 122, can be mounted on the basic part 10 as previously described.

The sole 58 is preferably produced by casting. The reinforcement members 76 and the insert 86, if required, can be cast as one piece with the sole 58. Although the description above discloses the use of the groove/wedge connection 48, similar results can be achieved by using any other suitable connection arrangement. Similarly, different geometries can be used for the fasteners 16, 70, the depression 52, and the continuation part 90. In addition, the horseshoe can be constructed without the border beading 22 and the edge clearance 64.

Preferably, the basic body 12 is produced by drop forging. By this process, the series of cutouts 14 and clearances for the series of nail holes 46, the end cutouts 36, the depression 52 and the border beading 22 can also be formed. As a result, the only required finish work is providing the groove 40, the undercut 54, and the nail holes 46. The groove and the undercut can be milled, and the nail holes can be cold-stamped. In order to fabricate the basic part 10, the fastening bolts 16 are then welded onto the monobloc-like basic body 12 within the first cut out portions 14 thereof.

Since other modifications and changes varied to suit particular operating requirements will be apparent to those skilled in the art, the present invention is not considered to be limited to the examples chosen for the purpose of disclosure, and thus covers all changes to the invention that do not constitute a departure from its true spirit and scope.

What is claimed is:

1. A horseshoe comprising:

a basic part, said basic part including a basic body and fastening elements, said basic body being horseshoe-shaped, said basic body having an abutment surface, first cut out portions and two legs, said abutment surface being affixable to a hoof of a horse, each of said two legs having a plurality of nail holes spaced along a longitudinal direction thereof, said fastening elements being disposed to project outward from said basic body in a direction opposite said abutment surface; and a sole attachable to said basic part, said sole having protrusions that engage said first cut out portions of said basic part and second cut out portions for receiving said fastening elements, wherein each of said fastening elements is a fastening bolt that projects from one of said first cut out portions, and each of said second cut out portions is disposed within one of said protrusions, said second cue out portions being dimensioned to receive said fastening elements.

2. The horseshoe of claim 1, wherein said first cut out portions and said protrusions are one of approximately cylindrical and approximately conical.

3. The horseshoe of claim 1, wherein each of said two legs of said basic body terminates in a grooved end portion, said grooved end portion being dimensioned to receive a wedge attached to said sole when said sole is attached to said basic part.

4. The horseshoe of claim 1, wherein a front portion of said basic body includes a depression that is dimensioned to receive an engagement element of said sole.

5. The horseshoe of claim 3, wherein a front portion of said basic body includes a depression that is dimensioned to receive an engagement element of said sole.

6. The horseshoe of claim 4, wherein an insert is attached to said front region of said sole and disposed parallel to a bottom surface of said sole, said insert being plate-like and having a retaining part that projects into said engagement element of said sole, said retaining part engaging said depression in said basic body.

7. The horseshoe of claim 5, wherein an insert is attached to said front region of said sole and disposed parallel to a bottom surface of said sole, said insert being plate-like and having a retaining part that projects into said engagement element of said sole, said retaining part engaging said depression in said basic body.

8. The horseshoe of claim 1, wherein said fastening bolt is a threaded weld-on bolt that is fastened to said basic body by pressure arc welding.

9. The horseshoe of claim 3, wherein said groove is closed toward a rear side of said end portion and open toward a front side, and wherein said wedge is further attached to a reinforcement member disposed within said sole.

10. The horseshoe of claim 7, wherein said groove is closed toward a rear side of said end portion and open toward a front side, and wherein said wedge is further attached to a reinforcement member disposed within said sole.

11. The horseshoe of claim 3, wherein said groove is closed toward a rear side of said end portion and open toward a front side, said wedge being attached to one end of a threaded sleeve, said threaded sleeve being insertable into a through passage of said sole, the other end of said threaded sleeve being disposed to threadedly engage a calk inserted from a standing surface of said sole.

12. The horseshoe of claim 7, wherein an insert is attached to said front region of said sole and disposed parallel to a bottom surface of said sole, said insert being plate-like and having a retaining part that projects into said engagement element of said sole, said retaining part engaging said depression in said basic body.

13. The horseshoe of claim 11, further comprising a hose-like, flexible snowguard insert having fastening eyelets, each of said fastening eyelets being disposed to engage one of said threaded sleeve and said protrusions, said snowguard insert being insertible between said sole and said basic body.

14. The horseshoe of claim 12, wherein a hose-like, flexible snowguard insert having fastening eyelets, each of said fastening eyelets being disposed to engage one of said threaded sleeve and said protrusions, said snowguard insert being insertible between said sole and said basic body.

15. The horseshoe of claim 4, wherein said nail holes, said first cut out portions, said depression and an end region of each of said two legs are formed by drop forging said basic body.

16. The horseshoe of claim 15, wherein an undercut is made in said depression, and wherein a groove is made in said end region to form a grooved end portion after said body is drop forged.

17. The horseshoe of claim 1, wherein said basic body includes a border beading and said sole includes an edge clearance dimensioned to mate with said border beading when said sole is attached to said basic part.

18. The horseshoe of claim 3, wherein said basic body includes a border beading and a depression that is dimensioned to receive an engagement element of said sole, said depression being disposed in a front portion of said basic body, and wherein said sole includes an edge clearance dimensioned to engage said border beading, whereby said edge clearance mates with said border beading when said sole is connected with said basic part.

19. The horseshoe of claim 1, wherein said sole is made of an elastic material.

20. The horseshoe of claim 1, wherein said nail holes are disposed between and offset from said first cut out portions toward an outer periphery of said basic part.

21. The horseshoe of claim 6, wherein said plate-like insert is harder than said sole and said retaining part engages an engagement element of said sole, said engagement element and said retaining part including undercut portions that engage each other to attach said sole to said basic part in said front region.

22. The horseshoe of claim 3, wherein a rear side of said grooved end portion is closed.

23. The horseshoe of claim 6, wherein said insert is embedded in said sole.

24. The horseshoe of claim 9, wherein said reinforcement member is embedded within said sole.

25. The horseshoe of claim 11, wherein an intermediate layer is disposed between said basic body and said threaded sleeve.

26. A horseshoe comprising:

a basic part, said basic part including a basic body and fastening elements, said basic body being horseshoe-shaped, said basic body having an abutment surface, an attachment surface disposed opposite said abutment surface, first cut out portions and two legs, said abutment surface being affixable to a hoof of a horse, said attachment surface including a clearance having an undercut portion, each of said two legs having a plurality of spaced nail holes along a longitudinal direction thereof, said fastening elements being disposed to project outward from said basic body in a direction opposite said abutment surface;

a sole attachable to said basic part, said sole having protrusions that engage said first cut out portions of said basic part, second cut out portions for receiving said fastening elements, and at least one through-passage; and a calk insert, said calk insert having a threaded sleeve with a wedge plate that engages said undercut portion of said clearance, an intermediate layer disposed between said threaded sleeve and said basic part, and a calk that extends through said through-passage in said sole to threadedly engage said threaded insert, thereby compressing said sole against said basic body.

27. A horseshoe comprising:

a basic part, said basic part including a basic body and fastening elements, said basic body being horseshoe-shaped, said basic body having an abutment surface, first cut out portions and two legs, said abutment surface being affixable to a hoof of a horse, each of said two legs having a plurality of spaced nail holes along a longitudinal direction thereof, said fastening elements being disposed to project outward from said basic body in a direction opposite said abutment surface;

a sole attachable to said basic part, said sole having an inner border, protrusions that engage said first cut out portions of said basic part, and second cut out portions receiving said fastening elements; and a snowguard, said snowguard being a flexible, hose-like insert extending along said inner border of said sole and being disposed between said basic body and said sole, said snowguard having fastening eyelets engageable with fasteners disposed on one of said basic part and said sole.

28. The horseshoe of claim 19, wherein said fasteners elements are disposed on said protrusions of said sole.

29. The horseshoe according to claim 1 wherein said protrusions have a circular cross-section and each of said second cut out portions is coaxial with one of said protrusions.

* * * * *